May 7, 1929.  W. C. MILLS  1,712,279
SPOOL HEAD
Filed June 27, 1928
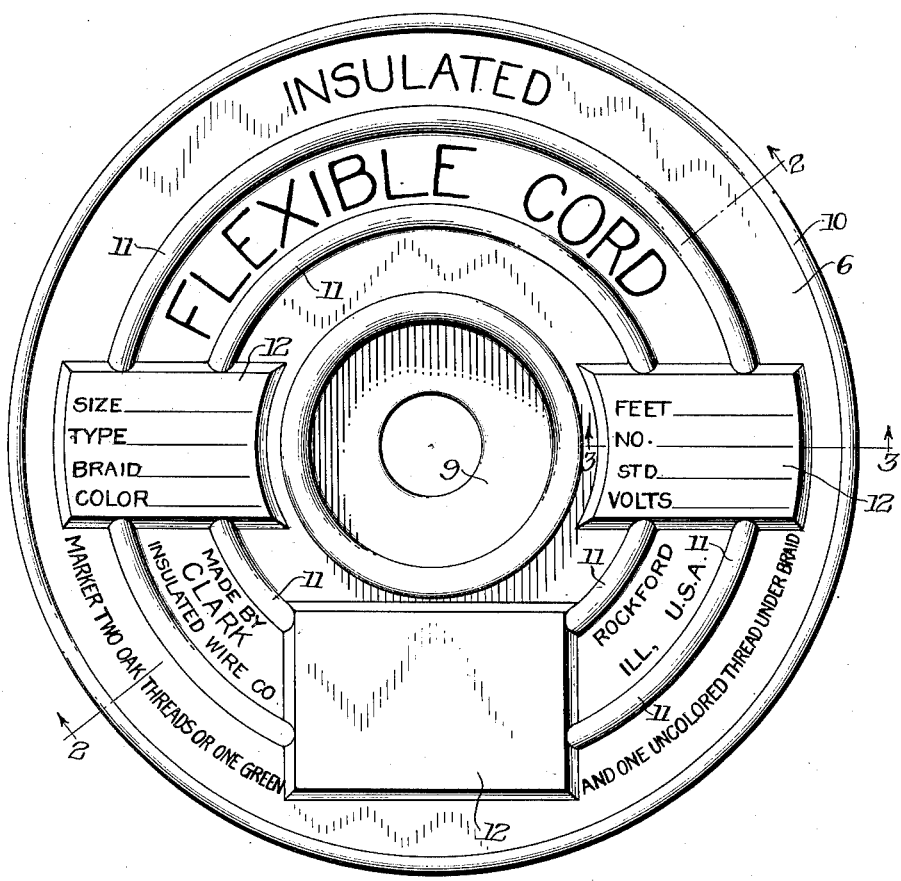
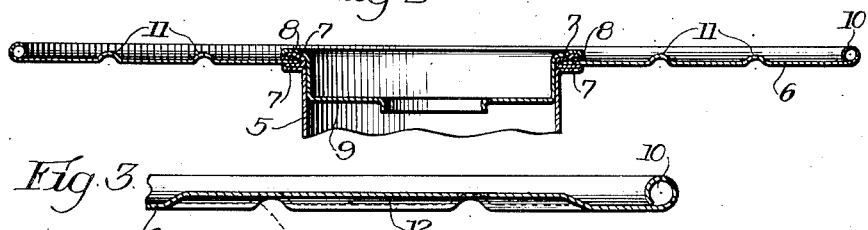
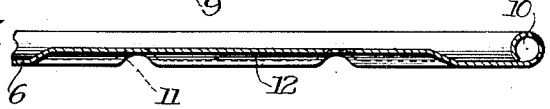
Inventor:
Wallace C. Mills
Attys Patented May 7, 1929.                                                             1,712,279

UNITED STATES PATENT OFFICE.

WALLACE C. MILLS, OF ROCKFORD, ILLINOIS, ASSIGNOR TO J. L. CLARK MANUFACTURING CO., OF ROCKFORD, ILLINOIS, A CORPORATION OF ILLINOIS.

SPOOL HEAD.

Application filed June 27, 1928. Serial No. 288,561.

The invention relates generally to spool heads and more particularly has reference to metallic heads for spools or reels which are especially adapted for use in displaying certain articles, such as wire or insulated electric conductors, for sale.

An object of the invention is to provide a spool head of this character which is sturdy and rigid in construction; is neat and attractive in appearance and which may be cheaply manufactured.

A more specific object of the invention relates to the provision of a spool head reinforced for strengthening purposes in a manner such as to attractively frame and define advertising matter and the like thereon.

Other objects and advantages will become apparent in the following description and in the accompanying drawings in which:

Figure 1 is a plan view of a spool head embodying the invention.

Figs. 2 and 3 are sectional views through different portions of the head taken respectively on the lines 2—2 and 3—3 of Fig. 1.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In spools of this type it is advantageous and desirable to utilize the outer blank face of each head to receive advertising matter and other desired information, and the greater portion of such matter is preferably lithographed on the head. According to my invention the heads are made from flat sheets or disks, which are first lithographed in accordance with a predetermined spacing of the matter to be used, and subsequently the heads are formed with raised portions arranged to frame and define the printed matter, thereby emphasizing it and producing a very neat, pleasing effect, while at the same time strengthening or stiffening the heads.

Generally reels of this type comprise a pair of suitable heads connected together in spaced relation by means of a hub or drum. In particularly describing the preferred embodiment of the invention only one head of the spool will be described, it being clearly understood that both heads may be substantially identical.

Referring to the drawings, 5 designates the drum or hub of the reel which may be of any suitable form such as the tubular one illustrated herein. The drum of course may be of any preferred length and each end thereof is adapted to have secured thereto a head 6. Preferably the union between each head and the drum is such as to provide the greatest possible rigidity to the structure. For example, in the present embodiment an arrangement of beads and flanges 7 adjacent the end of the drum is provided which receive the edge 8 of the centrally apertured head after which the parts may be rolled into an inseparable engagement. If desired, the union may be strengthened and improved in appearance by providing a cup shaped end cap 9 arranged to fit in the end of the tubular drum with the edges of the cap forming a part of the union between the head and the drum. Preferably, the outer edge of the head, which is shown herein as being substantially circular in form, is curled to form a reinforcing bead 10 about the periphery of the head.

The means by which the head is reinforced and at the same time is divided into a plurality of framed spaces comprises the provision of offset portions variously disposed about the surface of the head. Inasmuch as the head is generally formed of sheet metal such reinforcements may be in the form of spaced ribs 11 pressed from the surface of the head. As shown in Figure 1, the preferred disposition of the ribs 11 is in the form of rings concentrically arranged with respect to the axis of the drum. In this manner the head may be reinforced by merely offsetting certain portions of the surface, which portions divide the surface of the head into a number of defined spaces upon which printed matter may be placed.

In addition to the offset raised reinforcing ribs 11 it is desirable to offset one or more portions of the head to provide raised plane surfaces or pads 12 of substantial size, which also serve to reinforce the head. These portions are regularly disposed about the surface of the head, preferably interrupting the continuity of the concentric ribs 11, and may be formed at the same time as the reinforcing ribs. Preferably the raised pads 12 are offset from the surface of the head to the same extent as the ribs so that the edges of the pads cooperate with the ribs 11 in strengthening the head.

Thus it will be seen that the surface of the head is broken up into a number of spaces each of which are separated and defined by the raised reinforcing ribs and pads on the surface. This construction permits advertising matter, in plain or ornamental colors, to be lithographed in predetermined positions upon the blank unformed head, after which the blank head may be subjected to a die stamping or like process for forming the reinforcements and framing the printed matter.

One of the features of the invention resides in the provision of the raised surface reinforcements 12 which may first be lithographed to designate a general form arranged to denote the characteristics of the material to be wound upon the spool. Such a form for example as shown in Fig. 1 may include spaces for indicating the size, type, grade or color of wire which spaces may be properly filled in, as by printing or stamping, after the character of the wire, which is to be carried upon the roll, has been determined.

It will be readily apparent from the foregoing that a head has been provided for a spool of this character which is simple and sturdy in construction, which may be cheaply manufactured, and which is attractive in appearance due to the setting off or forming of various advertising receiving portions of the surface by the reinforcing members.

I claim as my invention:

1. In a reel having a tubular core, a head for either end of the core formed from a flat sheet of metal to provide a disk having an outer peripheral bead and arcuate ribs spaced radially inwardly from said bead concentrically thereof, said disk further having one or more raised radial portions in which the ends of the ribs terminate, and a cap fitting into the end of the tubular core and having a peripheral bead spaced inwardly from said arcuate ribs, said ribs, beads and radial portions coacting to stiffen the head and also to form spaces for receiving advertising matter or other data, and said cap further providing a centrally apertured end wall for the core.

2. In a reel having a tubular core, a head for each end of the core formed from a flat sheet of metal to provide a disk having an outer peripheral bead and annular ribs spaced radially inwardly from said bead concentrically thereof, and a cap fitting into the end of the core and having a peripheral bead spaced inwardly from said arcuate ribs and a central transverse wall portion depressed inwardly into the core and centrally apertured.

3. A spool head in the form of a disk formed from a flat sheet of metal and having concentrically disposed radially spaced arcuate ribs offset from the face of the disk and flat radially disposed panels in which the ends of said ribs terminate, said ribs together with the edges of said panels forming arcuate frames containing advertising matter or the like, and said radial panels being of substantial width to form spaces to receive suitable designating markings, the disk further having an outer peripheral bead coacting with said ribs and panels to provide a head of substantial rigidity.

In testimony whereof, I have hereunto affixed my signature.

WALLACE C. MILLS.